(No Model.)
W. A. SWIFT.
TETHER.
No. 544,447. Patented Aug. 13, 1895.
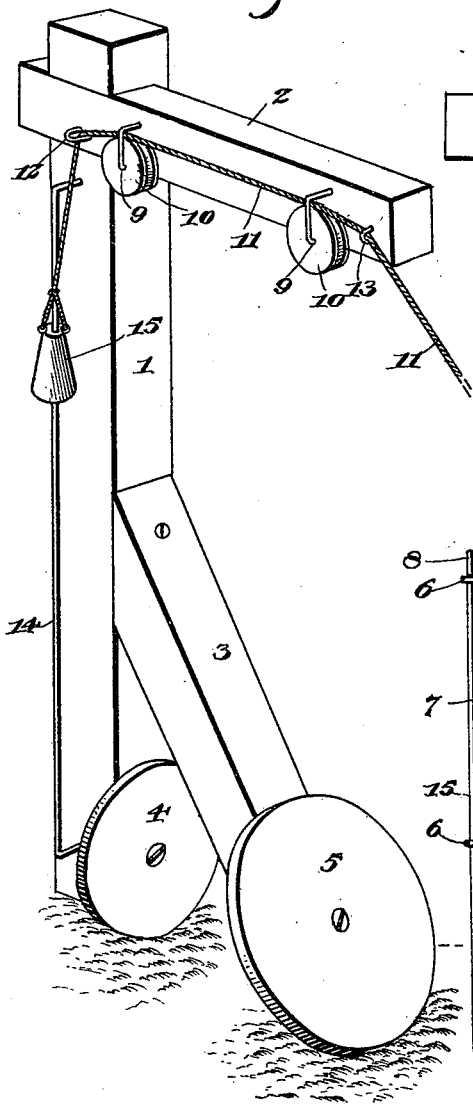
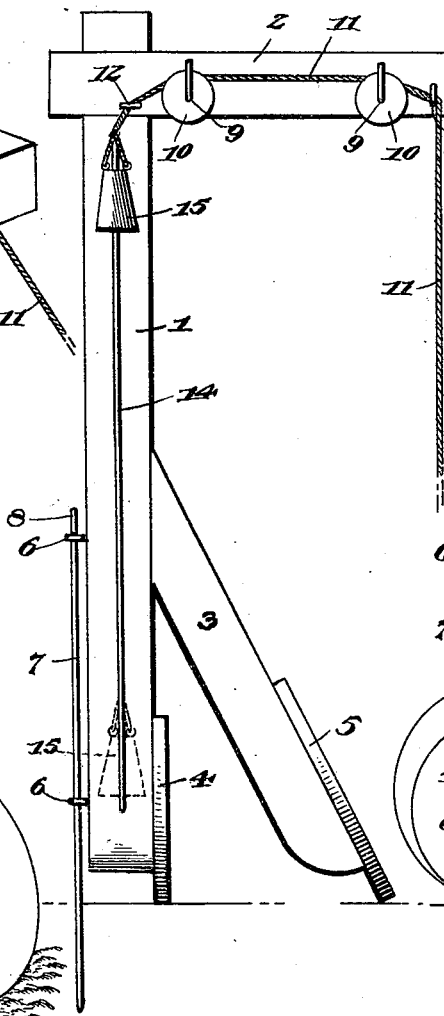
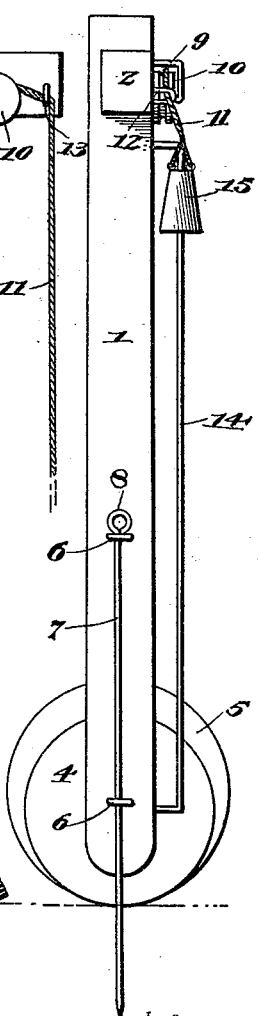
Witnesses
B. S. Ober
F. B. Clemens
Inventor
William A. Swift,
By his Attorneys.
C. A. Snow & Co.

UNITED STATES PATENT OFFICE.

WILLIAM A. SWIFT, OF RUSSELLVILLE, ASSIGNOR TO SAMUEL R. CUMMINGS AND THOMAS P. CAHILL, OF PHILADELPHIA, PENNSYLVANIA.

TETHER.

SPECIFICATION forming part of Letters Patent No. 544,447, dated August 13, 1895.

Application filed May 1, 1894. Serial No. 509,712. (No model.)

*To all whom it may concern:*

Be it known that I, WILLIAM A. SWIFT, a citizen of the United States, residing at Russellville, in the county of Chester and State of Pennsylvania, have invented a new and useful Tether, of which the following is a specification.

My invention relates to a tether adapted for restraining stock within certain limits, and the objects in view are to provide a simple and efficient device which may be erected with facility, which is capable of turning freely to accommodate the movements of the animal attached to the rope, and which is braced effectively in the direction of strain produced by the tethered animal.

Further objects and advantages of the invention will appear in the following description, and the novel features thereof will be particularly pointed out in the appended claim.

In the drawings, Figure 1 is a perspective view of a tether embodying my invention. Fig. 2 is a side elevation of the same. Fig. 3 is a rear view.

Similar numerals of reference indicate corresponding parts in all the figures of the drawings.

It is desirable to so construct devices of this class that their position may be changed without loss of time in order to place the animal in a fresh grazing area, and therefore I employ a stake or tether-pin 7 of the ordinary construction as a pivot for a frame comprising a vertical standard 1 and a horizontal arm 2. This stake or pin 7 may be driven in the ground at any point where it is preferred to place the tether, and it is provided at its upper end with a head 8 to prevent the accidental displacement of the eyes 6, by which said standard is connected to the stake. Inasmuch as this stake is the only means of pivoting and holding the frame in its upright or operative position it will be seen that a strain upon a tether-rope attached to the arm 2 would be liable, if not certain, to incline the frame in the direction of such strain, and in order to prevent such a displacement I employ a brace 3, attached at its upper end to the standard at an intermediate point and provided at its lower end with a rotary wheel or disk 5 to roll upon the surface of the ground in a circular path around the stake as a center, said wheel or disk being in a plane parallel with the brace, and the brace being in the same vertical plane as the arm 2 and upon the same side of the standard. Therefore a strain upon the frame caused by a rope connected to the arm 2 would be resisted directly and positively by the inclined brace, thus relieving the stake. In order to support the weight of the frame and allow it to move freely around the stake as a center, I also mount a wheel or disk 4 at the lower end of the standard.

The tether-rope 11 passes through suitable guide-eyes 12 and 13 on the arm 2 and over intermediate antifriction-rolls 10, mounted in keepers 9, and attached to the inner end of this tether-rope is a tension-weight 15, which is slidably mounted upon a vertical guide-rod 14 carried by the standard. This guide-rod allows the weight free vertical movement, but prevents lateral vibration, swinging, &c., and thus prevents the portion of the tether-rope which is between the weight and the first guide-eye 12 from becoming entangled with the other parts of the apparatus. It will be seen that when the weight reaches the upper end of the guide-rod and is stopped thereby any further draft upon the tether-rope would have a tendency to incline the frame in the direction of the strain; but owing to the fact that the tether-rope is carried through suitable guides to the outer end of the arm 2, said arm always assumes a position parallel with the direction of strain, and this disposition of the arm 2 causes a similar disposition of the brace 3, and hence the strain is resisted and the frame is held in its vertical position. The use of a single brace, as described, reduces the weight and the cost of manufacture of the apparatus, and by the employment of the lateral arm 2, through which connection is made with the standard, said brace is rendered as effective as a plurality of stationary braces.

It will be understood that in practice various changes in the form, proportion, and the minor details of construction may be resorted to without departing from the spirit or sacrificing any of the advantages of the invention.

Having described my invention, I claim—

The herein described tethering device comprising a stake or tether pin 7, a vertical standard 1 provided with eyes 6 for engagement with the stake or tether pin and having at its lower end a supporting-wheel or disk 4 arranged in a plane parallel with that side of the standard to which said eyes are attached, a horizontal arm 2 extending laterally from the standard at its upper end and arranged parallel with the axis of said supporting-wheel or disk 4, an inclined brace 3 secured to the standard at an intermediate point and extending laterally and downwardly beneath said arm, whereby the brace is arranged in the same vertical plane with, and upon the same side of the standard as, the arm, an auxiliary supporting wheel or disk 5 mounted upon the lower extremity of the brace with the lowest point of its periphery in the same horizontal plane with that of the first mentioned supporting-wheel or disk 4, a tether rope 11 extending through guides at the outer and inner ends of said lateral arm, and a weight 15 attached to the inner end of said rope and guided by means carried by the standard, whereby as the tethered animal moves around the stake or tether pin as a center the lateral arm is turned about the same center and at all times occupies a position in a plane parallel with the strain upon the tether rope, said brace occupying a position in the same plane, substantially as specified.

In testimony that I claim the foregoing as my own I have hereto affixed my signature in the presence of two witnesses.

WILLIAM A. SWIFT.

Witnesses:
JOHN H. SIGGERS,
GEO. C. SHOEMAKER.